June 16, 1936.    E. H. MUELLER    2,044,254
LOCKING VALVE
Filed Feb. 25, 1935
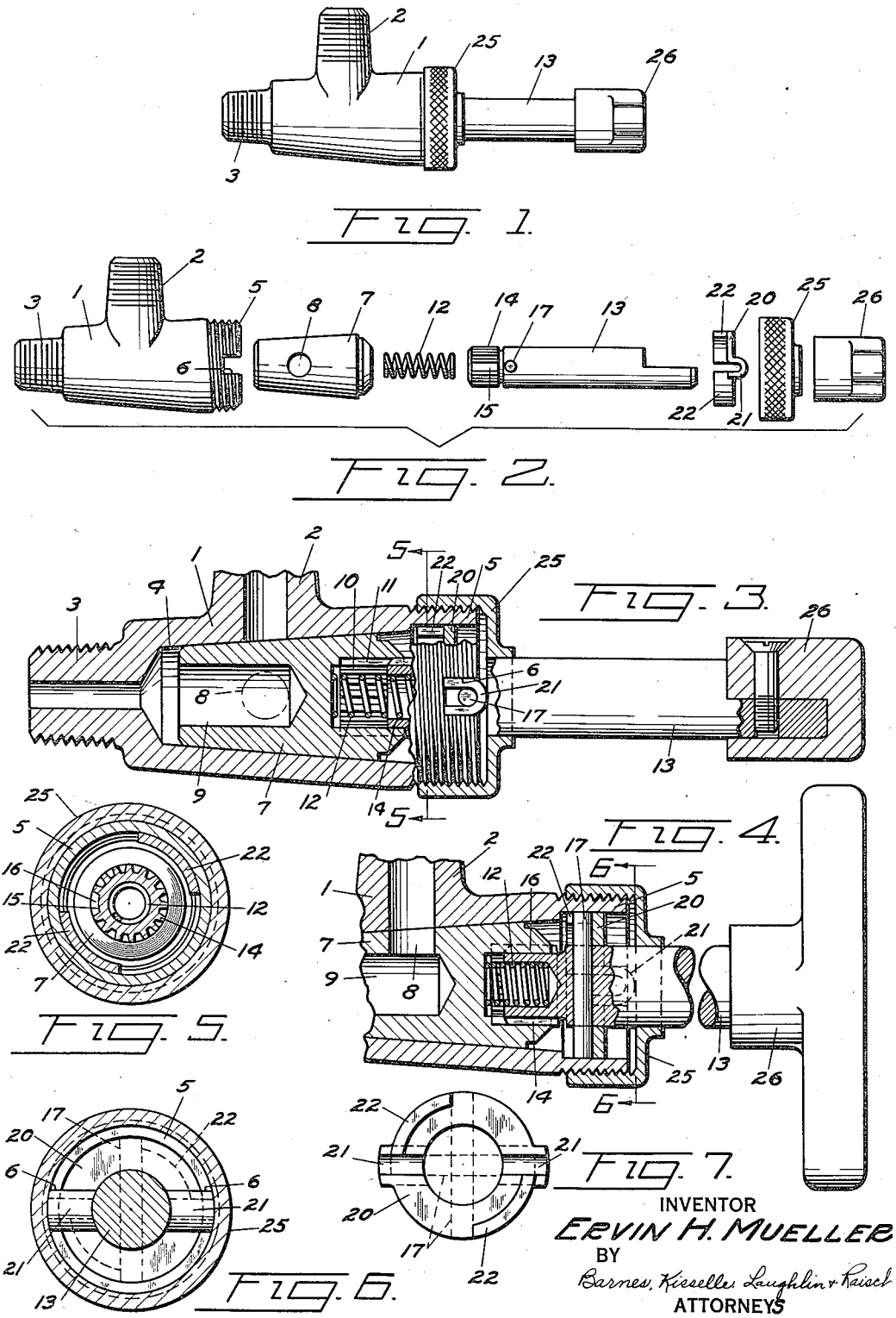
INVENTOR
ERVIN H. MUELLER
BY
Barnes, Kisselle, Laughlin & Raisch
ATTORNEYS Patented June 16, 1936

2,044,254

UNITED STATES PATENT OFFICE 2,044,254

LOCKING VALVE

Ervin H. Mueller, Detroit, Mich.

Application February 25, 1935, Serial No. 7,937

7 Claims. (Cl. 251—165)

This invention relates to a valve and it has to do especially with a locking valve useful for the purpose of controlling gas flow.

More specifically, the invention is directed to the provision of a valve which is particularly adapted for use on gas appliances, such as gas heaters or stoves, ranges, plates and the like. Of course, it should be appreciated that the valve structure of this invention is not limited to such use. The invention has as its principal object the provision of an improved structure in a locking valve, which structure is of a simple nature and yet one which is sure in operation, strong and rugged, to the end that the valve may be produced at a low cost, has a longer life, and is capable of correct operation during such life.

In the accompanying drawing:

Fig. 1 is a side elevational view of a valve.

Fig. 2 is a composite view illustrating the several parts of the valve structure.

Fig. 3 is an enlarged cross sectional view taken through the valve structure.

Fig. 4 is a cross sectional view showing the valve in on position.

Fig. 5 is a cross sectional view taken on line 5—5 of Fig. 3.

Fig. 6 is a cross sectional view taken on line 6—6 of Fig. 4.

Fig. 7 is a view of the underside of the locking washer showing the locking pin in two extreme positions.

The valve has a body 1 with an inlet 2 and an outlet 3. The body has a central bore which constitutes a valve seat 4. The body of the valve is screw threaded as at 5, and this end is provided with diametrically opposite slots or recesses 6 which may be milled or otherwise formed. A valve member 7 is designed to seat in the body and it has a port 8 and passageway 9 and is turnable to connect the inlet and outlet, and turnable to plug the inlet. The valve member has a central bore 10 provided with internal splines or serrations 11; a coil spring 12 is designed to be positioned in the bore, and a stem 13 with a splined or serrated end 14 slidably engaged in the bore. This end of the stem is advantageously provided with a bore for receiving one end of the spring. The bore and serrated end each have a certain irregularity in the serrated formation so that the two may be assembled only in one relation. To this end, one ridge is absent from the serrations on the stem leaving a substantial flat 15 and one furrow is omitted in the bore of the valve leaving a corresponding flat 16.

The stem carries a cross pin 17. This cross pin 17 is designed to cooperate with a controlling washer, but which may be a stamping. The washer has a body 20 of a diameter such as to substantially fit within the enlarged end of the valve body. The washer has diametrically opposite recesses 21 formed by fashioning the metal of the washer substantially U shaped, as shown in Figs. 3 and 4, and these U shaped parts project outwardly from the diameter of the washer, as shown in Fig. 7. The washer has oppositely positioned stop members 22 which, as shown herein, comprise flange-like parts rising substantially from the peripheral edge of the washer. The washer is designed to be associated with the body of the valve by disposing the body of the washer within the enlarged end of the valve body and with the U shaped formations 21 located in the recesses 6. In this position, the ends of the legs of each U preferably make contact with the bottom of each recess with the bight portion preferably projecting slightly beyond the valve body. A cap 25 is to be screw threaded to the valve body and as shown in Fig. 3; the cap fits down against the bight of the U formation and holds the washer tight. A suitable handle 26 may be attached to the end of the operating stem.

In making the assembly, the valve member may be placed in the body, the spring located, the stem telescoped into the valve bore, and then the washer is positioned with the ends of the pin 17 seated in the U formations. The cap may then be passed over the stem and screw threaded to the body until it is screwed home, binding the U formations of the washer. The handle 26 may now be attached to the stem. By assembling the parts when the locking pin is in the locking U, the valve member 7 must be located in the valve body in off position because the stem and valve member can be assembled in one relative position.

When the valve is so assembled, it is in off position and it cannot be turned with locking pin 17 located in U shaped locking recesses. To turn the valve, the handle is pushed inwardly in, compressing spring 12, whereupon the pin 17 shifts out of the locking U shaped recesses to the position illustrated in Fig. 4 and the valve may be turned. In the present form, the valve may be turned substantially 90° at which time the locking pin strikes the stop members 22 as shown by the dotted lines in Fig. 7. At this time and during the turning of the valve, if there is no endwise pressure which overcomes spring 12, the locking pin rides on the face of the washer by pressure of the spring. When the valve is turned off, the spring snaps the stem endwise and the locking pin seats in the locking recesses. The valve cannot be turned past off position since the ends of the pin 17 strike the opposite ends of shoulders 22 which, as shown in Fig. 7, are in alignment with the U formations. This structure is of a simple, rugged nature requiring a simple operation on the valve body to provide the opposite notches, and the locking member comprises a washer which may be a stamping fashioned with the stops and locking recesses. So long as the valve is in assembly, the locking washer cannot come loose. Only one operation of milling the slots in the valve body is required, since the valve body, as has heretofore been practiced, is fashioned to not only provide locking notches but also to provide limiting stops. This is all taken care of by the washer in the present case. The sliding connection between the stem and valve body may take various forms so long as the valve and stem are non-rotatably locked and slidable relative to each other, although the serration type of connection as shown is preferred and this construction is claimed in a separate application.

I claim:

1. A valve structure comprising a valve body having a valve seat therein, the body having a part projecting beyond the valve seat, said part having oppositely disposed notches, a valve member rotatable on the seat, an operating stem having its forward end slidably and non-rotatably connected to the valve member whereby said end imparts the entire rotary movement to the valve member, a spring acting upon the stem, oppositely disposed locking projections carried by the stem and located to the rear of the said forward end, a locking washer disposed within the said projecting part of the valve body, said locking washer having oppositely disposed U shaped formations projecting beyond the outer peripheral edge of the washer and said projecting parts located in the said notches and adapted to receive the locking projections and a cap through which the stem extends and screw threaded to the projecting part of the valve body.

2. A valve structure comprising a valve body having a valve seat therein, the body having a part projecting beyond the valve seat, said part having oppositely disposed notches, a valve member rotatable on the seat, an operating stem having its forward end slidably and non-rotatably connected to the valve member to drive the valve member, a spring acting upon the stem, oppositely disposed locking projections on the stem located to the rear of said forward end and entirely disassociated with the valve member, a locking washer fitted within the projecting part of the valve body and having oppositely disposed U shaped formations projecting beyond the outer peripheral edge of the washer and located in said notches, said U shaped formations adapted to receive the locking projections, the bight portions of the U formations projecting out of said notches and the ends of the legs of the U formations contacting with the bottoms of said notches, and a cap through which the stem extends and screw threaded to the valve body and contacting with the bight portions of the U shaped formations.

3. A valve structure comprising a valve body having a valve seat therein, the body having a part projecting beyond the valve seat, said part having oppositely disposed notches, a valve member rotatable on the seat, an operating stem having its forward end slidably and non-rotatably connected to the valve member and establishing the sole driving connection between the stem and valve member, a spring acting upon the stem and reacting against the valve member, oppositely disposed locking projections on the stem positioned to the rear of said forward end, a locking washer fitted within the projecting part of the valve body and having oppositely disposed U shaped formations projecting beyond the outer peripheral edge of the washer and located in said notches, said U shaped formations adapted to receive the locking projections, stop elements on the washer for cooperation with the locking projections to limit rotation of the stem and valve, the overall depth of the U formations being somewhat greater than the depth of the notches in the valve body, and a cap secured to the valve body and through which the stem extends and abutted against the bight portions of the U formations.

4. A valve structure comprising a valve body having a valve seat therein, the body having a part projecting beyond the valve seat, said part having oppositely disposed notches, a valve member rotatable on the seat, an operating stem having its forward end slidably and non-rotatably connected to the valve member and providing the sole driving connection between the stem and valve member, a spring acting upon the stem and reacting against the valve member, a cross pin carried by the stem and having oppositely projecting ends, and positioned to the rear of said forward end, a locking washer disposed within the projecting part of the valve body and having oppositely disposed U formations for receiving the pin ends, said U formations projecting beyond the outer peripheral edge of the washer and fitted in the notches of the body, means on the washer for cooperation with the pin to limit rotation thereof, the U formations of the washer projecting out of the recesses slightly beyond the end of the valve body, and a cap through which the stem extends and screw threaded to the body and adapted to abut against the U formations of the washer to hold the same clamped to the valve body.

5. For a locking valve having a rotary and axially shiftable valve operating member with oppositely disposed locking projections and having a valve body with oppositely disposed notches; a locking washer comprising a single metal stamping adapted to fit within the valve body and having oppositely disposed U shaped formations for receiving the projections, said U shaped formations projecting beyond the outer peripheral edge of the washer and adapted to fit within the notches of the body.

6. For a locking valve having a rotary and axially shiftable valve operating member with oppositely disposed locking projections and having a valve body with oppositely disposed notches; a locking washer comprising a single metal stamping adapted to fit within the valve body and having oppositely disposed U shaped formations for receiving the projections, said U shaped formations projecting beyond the outer peripheral edge of the washer and adapted to fit within the notches of the body, and at least one flange-like element fashioned to project from one edge of the washer for limiting rotation of the locking projections relative to the washer.

7. A locking valve comprising, a valve body having a valve seat, a valve member rotatable on the seat, said valve member having a recess in one end, an operating stem, the forward end of the stem and said recess interfitting and formed with interfitting serrations for establishing a driving connection between the stem and valve member, a spring in the recess acting upon the stem and reacting against the valve member, a cross pin carried by the stem and positioned to the rear of the end of the stem which fits in the recess, the valve body having oppositely disposed notches, a washer comprising a single piece of stamped metal having oppositely disposed U shaped portions which project outwardly from the peripheral edge of the washer and lying in the notches in the body, said U shaped portions arranged to receive the projecting ends of the cross pin to lock the stem against rotation, said stem being shiftable toward the valve member to disengage the cross pin so that the stem and valve may be turned, said washer having an integral flange projecting axially therefrom and extending through a range of substantially 90° from a U shaped member and serving to limit rotation of the stem by engagement thereof by the cross pin, one end of the flange stopping the cross pin when the same is in alignment with the U shaped portions, and a cap through which the stem extends and screw threaded to the valve body and abutting the bight portions of the said U shaped members on the washer to hold the washer snugly positioned in the notches of the valve body.

ERVIN H. MUELLER.